US008221539B2

(12) United States Patent
Fechner et al.

(10) Patent No.: US 8,221,539 B2
(45) Date of Patent: Jul. 17, 2012

(54) DRY PIGMENT PREPARATIONS COMPRISING ANIONIC ADDITIVES

(75) Inventors: Bjoern Fechner, Wasbek (DE); Carsten Schaefer, Muehldorf (DE); Alexander Woerndle, Frankfurt am Main (DE); Dietmar Beck, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/059,174

(22) PCT Filed: Jul. 17, 2009

(86) PCT No.: PCT/EP2009/005200
§ 371 (c)(1),
(2), (4) Date: Apr. 13, 2011

(87) PCT Pub. No.: WO2010/020316
PCT Pub. Date: Feb. 25, 2010

(65) Prior Publication Data
US 2011/0184097 A1  Jul. 28, 2011

(30) Foreign Application Priority Data

Aug. 16, 2008 (DE) .......................... 10 2008 037 973
Jul. 17, 2009 (WO) ................. PCT/EP2009/005200

(51) Int. Cl.
C09B 67/00 (2006.01)
C09B 67/20 (2006.01)
C09D 17/00 (2006.01)
C09D 5/00 (2006.01)
C08K 5/00 (2006.01)

(52) U.S. Cl. ........ 106/493; 106/413; 106/476; 106/494; 106/495; 106/496; 106/497; 106/498; 524/81

(58) Field of Classification Search ................ 106/413, 106/476, 493, 494, 495, 496, 497, 498, 499; 524/81
See application file for complete search history.

(56) References Cited

U.S. PATENT DOCUMENTS

| | | | |
|---|---|---|---|
| 4,156,616 A | 5/1979 | Kietz et al. | |
| 4,293,475 A * | 10/1981 | Sidi | 523/410 |
| 5,472,617 A * | 12/1995 | Barthold et al. | 210/708 |
| 6,582,510 B1 * | 6/2003 | Schwartz | 106/499 |
| 2002/0019459 A1 * | 2/2002 | Albrecht et al. | 523/161 |
| 2002/0137865 A1 | 9/2002 | Haubennestel et al. | |
| 2003/0144378 A1 * | 7/2003 | Mizushima et al. | 523/160 |
| 2003/0144399 A1 * | 7/2003 | Matta et al. | 524/419 |
| 2008/0192098 A1 * | 8/2008 | Tsuru et al. | 347/100 |
| 2008/0293874 A1 | 11/2008 | Schrod et al. | |
| 2009/0007820 A1 * | 1/2009 | Itoh et al. | 106/400 |
| 2009/0095202 A1 | 4/2009 | Fechner et al. | |
| 2009/0221739 A1 * | 9/2009 | Knischka et al. | 524/505 |
| 2009/0234062 A1 | 9/2009 | Kok et al. | |
| 2010/0116010 A1 | 5/2010 | Fechner et al. | |
| 2010/0137536 A1 | 6/2010 | Fechner et al. | |
| 2010/0137537 A1 | 6/2010 | Fechner et al. | |
| 2011/0065879 A1 | 3/2011 | Fechner et al. | |
| 2011/0107803 A1 | 5/2011 | Fechner et al. | |
| 2011/0144245 A1 | 6/2011 | Fechner et al. | |
| 2011/0144280 A1 | 6/2011 | Fechner et al. | |
| 2011/0160404 A1 | 6/2011 | Fechner et al. | |
| 2011/0213094 A1 | 9/2011 | Fechner et al. | |
| 2011/0244385 A1 | 10/2011 | Fechner et al. | |

FOREIGN PATENT DOCUMENTS

| | | | |
|---|---|---|---|
| DE | 2638946 | | 3/1978 |
| DE | 102005019384 | | 11/2006 |
| DE | 102007021867 A1 * | | 11/2008 |
| DE | 102008038071 | | 2/2010 |
| EP | 0264841 | | 4/1988 |
| EP | 1081169 | | 3/2001 |
| EP | 1142972 A2 * | | 10/2001 |
| EP | 1323789 | | 7/2003 |
| EP | 1371685 A2 * | | 12/2003 |
| EP | 1562696 | | 6/2004 |
| WO | WO02/51948 A2 * | | 5/2002 |
| WO | WO03/037984 A1 * | | 5/2003 |
| WO | WO 2006/038727 | | 4/2006 |
| WO | WO2006/074969 A1 * | | 7/2006 |
| WO | WO2006/098261 A1 * | | 9/2006 |

OTHER PUBLICATIONS

PCT International Search Report for PCT/EP2009/005200, mailed Nov. 16, 2009.
English Translation of PCT International Preliminary Report on Patentability for PCT/EP2009/005200, mailed Mar. 3, 2011.

* cited by examiner

Primary Examiner — Anthony J Green
(74) Attorney, Agent, or Firm — Anthony A. Bisulca

(57) ABSTRACT

The invention relates to pigment preparations containing (i) at least one organic and/or inorganic pigment, and (ii) a dispersant of formula (I) or (II), or mixtures of dispersants of formulae (I) and (II), wherein A is $C_2$-$C_4$ alkylene and B is a $C_2$-$C_4$ alkylene different from A, D is propylene, and Q is $SO_3$, $CH_2$—COO, $PO_3M$ or QM.

9 Claims, No Drawings

DRY PIGMENT PREPARATIONS COMPRISING ANIONIC ADDITIVES

The present invention relates to dry pigment formulations containing novel anionic polymers as dispersants, and also to their use for coloring natural and synthetic materials.

It is a recent trend to offer universally compatible dry pigment formulations. These are made by drying liquid dispersions. Dispersing pigments in liquid media typically requires dispersants. Dispersants, augmented by suitable surfactants, also known as wetters, act as surface-active agents in promoting the wetting of the pigments to be dispersed, and facilitate the deconstruction of agglomerates and aggregates when producing pigment dispersions, which is generally accomplished with the aid of a grinding operation. Dispersants can be of anionic, cationic, amphoteric or neutral structure. They can be of low molecular weight, or represent high molecular weight polymers which constitute a random, alternating, blocklike, comblike or star-shaped architecture of the polymerized monomers.

Examples of where dispersants are of particular commercial importance are the dispersing of pigments in the manufacture of pigment concentrates (used for coloration of emulsion and varnish colors, paints, coatings and printing inks) and also the coloration of paper, cardboard and textiles.

Lately, in order to serve the market and its trend toward dry formulations, interest has focused on the search for dispersants and additives which, following a drying operation performed on the liquid dispersion, ensure rapid dissolving of the dry powder or granulate in the application medium. Comb polymers can be useful here.

Comb copolymers are usually prepared using macromonomers based on mono(meth)acrylic esters as comonomers, and they differ from other polymeric dispersants in that they have a clearly ordered structure wherein hydrophobicity and hydrophilicity, or polarity, can be apportioned between the main chain and the side chains.

EP 1 293 523 describes a dispersant which is a polymer which has a weight average molecular weight of about 5000 to 100 000 and comprises 20% to 80% by weight of a hydrophilic backbone and 80% to 20% by weight of macromonomeric side chains. The backbone consists of 70% to 98% by weight, based on the weight of the backbone, of polymerized ethylenically unsaturated monomers free of any carboxyl groups, and also 2% to 30% by weight of polymerized ethylenically unsaturated monomers bearing a carboxyl group, wherein at least 10% of the carboxyl groups are neutralized with an amine or an inorganic base. The backbone is hydrophilic in comparison to the side chains. The side chains consist of macromonomers of polymerized ethylenically unsaturated monomers.

EP 1 081 169 describes branched polymers derived from the following mixture of monomers:
(A) 50% to 93% by weight of at least one ethylenically unsaturated monomer,
(B) 2% to 25% by weight of at least one ethylenically unsaturated macromonomer having a molecular weight of 1000 to 20 000, and
(C) 5% to 25% by weight of at least one polymerizable imidazole derivative.

EP 1 562 696 describes polymeric dispersants synthesized, in aqueous emulsion polymerization, using macromonomers consisting of polyalkylene glycol mono(meth)acrylates. The main chain of the polymer must contain ethylenically unsaturated monomers having at least one amino group.

DE 10 2005 019 384 describes comb polymers which are synthesized from ethylenically unsaturated monomers such as alkyl(meth)acrylates and aryl (meth)acrylates in combination with a pure polyethylene glycol mono(meth)acrylate, and are used as dispersants.

EP 1 323 789 describes comb-type polymers which contain polyalkylene oxide mono(meth)acrylate units, yet are not water soluble. An object is to provide aqueous inks. EP 1 491 598 is similar in that it contains polyalkylene oxide mono (meth)acrylate units and salt-forming monomers; the polymers are used for aqueous inks.

The patents cited describe the state of the art of providing comb-shaped or block-forming polymers as dispersants. However, the dried powders or granulates are easily dispersed in an aqueous system only or in a solvent-containing system only. No invention described to date provides dispersants capable of effectively stabilizing aqueous pigment dispersions which are subsequently readily dryable, for example by spray drying, to produce a powder or granulate capable of easy dispersion in aqueous and solvent-containing systems alike, with rapid and high development of color strength. The decisive advantage here is the universal dispersibility of the powder or granulate in both aqueous and solvent-containing systems.

It has now been found that, surprisingly, specific anionic comb copolymers, prepared by means of macromonomers composed of polyethylene/polypropylene glycol mono (meth)acrylic esters, achieve the object described, viz., dry pigment formulations satisfying the requirement of universal dispersibility. By "dry" is meant a free-flowing powder or granulate.

The present invention accordingly provides pigment formulations containing
(i) at least one organic and/or inorganic pigment,
(ii) a dispersant of formula (I) or (II), or mixtures of dispersants of formulae (I) and (II),

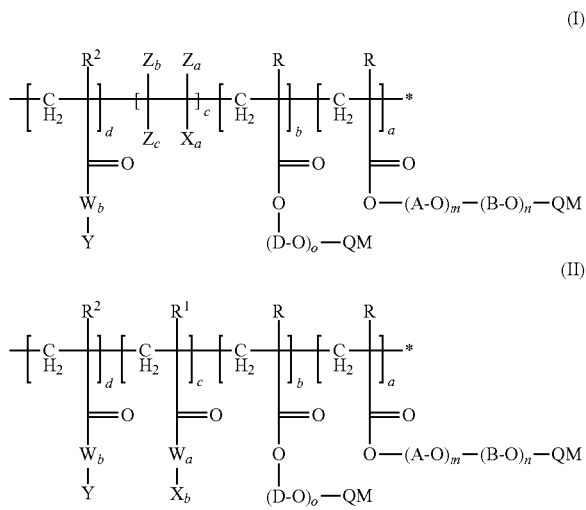

where
$a = 0.001\text{-}0.9$; $b = 0.001\text{-}0.9$; $c = 0.001\text{-}0.9$; $d = 0.001\text{-}0.9$; preferably
$a = 0.001\text{-}0.7$; $b = 0.01\text{-}0.8$; $c = 0.001\text{-}0.5$; $d = 0.001\text{-}0.5$;
subject to the proviso that the sum of $a+b+c+d$ equals 1;
A represents $C_2$- to $C_4$-alkylene,
B represents a $C_2$- to $C_4$-alkylene other than A,
R represents hydrogen or methyl,
m is from 1 to 500, preferably from 1 to 50;

n is from 1 to 500, preferably from 1 to 50,
subject to the proviso that the sum m n equals 2 to 1000;
D represents $C_3$-alkylene,
o is from 2 to 500, preferably from 2 to 100, more preferably from 2 to 50 and even more preferably from 5 to 25;
$X_a$ represents an aromatic or araliphatic radical having 3 to 30 carbon atoms which optionally contains one or more, for example 1, 2 or 3, of the heteroatoms N, O and S,
$Z_a$ represents H or ($C_1$-$C_4$)-alkyl,
$Z_b$ represents H or ($C_1$-$C_4$)-alkyl,
$Z_c$ represents H or ($C_1$-$C_4$)-alkyl;
$R^1$ represents hydrogen or methyl,
$X_b$ represents an aromatic or araliphatic radical having 3 to 30 carbon atoms which optionally contains one or more, for example 1, 2 or 3, of the heteroatoms N, O and S,
$W_a$ represents oxygen or an NH group;
$R^2$ represents hydrogen or methyl,
Y represents an aliphatic hydrocarbyl radical having 1 to 30 carbon atoms, preferably from 6 to 30 and more preferably from 9 to 20 carbon atoms which may be linear or branched or else cyclic, and which may contain heteroatoms from the group consisting of O, N and S, and may also be unsaturated,
$W_b$ represents oxygen or an NH group;
Q represents $SO_3$, $CH_2COO$, $PO_3M$,
or QM represents

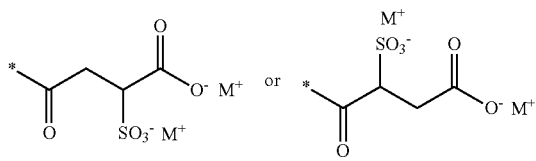

M represents H, a metal cation or an ammonium, for example Na, K, Ca, $NH_4^+$, an alkylated ammonium ion, or a combination thereof (the asterisk * in the Markush formula indicates that there is a link to the polymer at this site).

Possible further components are:
(iii) wetters,
(iv) further surfactants and/or dispersants,
(v) further additive materials customary for preparing aqueous pigment dispersions.

Preferred pigment formulations contain in the dry state from 30% to 90% by weight, for example from 50% to 85% by weight, of component (i).

Preferred pigment formulations contain in the dry state from 0.1% to 30% by weight, for example from 5% to 30% by weight, of component (ii).

Particularly preferred pigment formulations contain by way of component
(i) 60% to 85% by weight, for example 70% to 80% by weight,
(ii) 10% to 30% by weight, for example 10% to 25% by weight,
(iii) 0% to 10% by weight, for example 0.1% to 2% by weight,
(iv) 0% to 20% by weight, for example 1% to 20% by weight,
(v) 0% to 20% by weight, for example 1% to 10% by weight,
all based on the total weight (100% by weight) of the dry pigment formulation.

When one or more of components (iii), (iv) and (v) are present, their minimum concentrations, independently of each other, are preferably at least 0.01% by weight and more preferably at least 0.1% by weight, based on the total weight of the dry pigment formulation.

Component (i) in the pigment formulation of the present invention is a finely divided organic or inorganic pigment or a mixture of various organic and/or inorganic pigments. Component (i) can also be a dye that is soluble in certain solvents and has pigment character in other solvents.

Useful organic pigments include monoazo, disazo, laked azo, β-naphthol, Naphthol AS, benzimidazolone, disazo condensation, azo metal complex pigments, and polycyclic pigments, such as phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline or diketopyrrolopyrrole pigments or carbon blacks.

Of the organic pigments mentioned, those which are in a very fine state of subdivision for producing the formulations are particularly suitable, and preferably 95% and more preferably 99% of the pigment particles have a particle size ≦500 nm.

An exemplary selection of particularly preferred organic pigments includes carbon black pigments, for example lamp or furnace blacks; monoazo and disazo pigments, in particular the Color Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment. Yellow 219, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, in particular the Color Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Color Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Color Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Color Index pigments Pigment Yellow 139 or Pigment Yellow 173; phthalocyanine pigments, in particular the Color Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Color Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Color Index pigments Pigment Red 169, Pigment Blue 56 or Pigment Blue 61; diketopyrrolopyrrole pigments, in particular the Color Index pigments Pigment Red 254, Pigment Red 255, Pigment Red 264, Pigment Red 270, Pigment Red 272, Pigment Orange 71, Pigment Orange 73, Pigment Orange 81.

Laked dyes such as calcium, magnesium and aluminum lakes of sulfonated and/or carboxylated dyes are also suitable.

Suitable inorganic pigments include for example titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and of aluminum, rutile mixed phase pigments, sulfides of the rare earths, spinels of cobalt with nickel and zinc, spinels based on iron and chromium with copper zinc and also manganese, bismuth vanadates and also blend pigments. The Color Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33 and also Pigment White 6 are used in particular. Preference is frequently also given to using mixtures of inorganic pigments. Mixtures of organic with inorganic pigments are likewise often used.

Instead of pigment dispersions it is also possible to prepare dispersions of solids including for example natural finely divided ores, minerals, sparingly soluble or insoluble salts, particles of wax or plastic, dyes, crop protection and pest control agents, UV absorbers, optical brighteners and polymerization stabilizers.

The copolymers (component ii) have a molecular weight of $10^3$ g/mol to $10^9$ g/mol, more preferably of $10^3$ to $10^7$ g/mol and even more preferably $10^3$ to $10^5$ g/mol. These polymers are obtainable by free-radical polymerization of the hereinbelow described monomers [A], [B], [C] and [D]. Following the polymerization, the nonionic polymer thus obtained is converted to anionic functionalities. Examples of anionic functionalities are $SO_3M$, $CH_2COOM$, $PO_3M_2$ or sulfosuccinate. Since the conversion of the nonionic polymer to anionic functionalities is usually not quantitative, the usual result is a mixture of converted (QM=$SO_3M$, $CH_2COOM$, $PO_3M_2$, sulfosuccinate) and unconverted (QM=H) polymer. This mixture is practically impossible to resolve, and is used as such in the pigment formulation of the present invention.

The method of preparation is described in DE 10 2008 038 071.

The copolymers have customary terminal groups formed by the initiation of the free-radical polymerization or by chain transfer reactions or by chain termination reactions, for example a proton, a group out of a free-radical initiator or a sulfide containing group out of a chain transfer reagent.

In the copolymers, the molar fraction of the monomers is preferably 0.1 to 90% for monomer [A], 0.1 to 90% for monomer [B], 0.1 to 90% for monomer [C] and 0.1 to 90% for monomer [0], the molar fractions summing to 100%.

More preferably, the molar fraction of the monomers is 0.1 to 70% for monomer [A], 10 to 80% for monomer [B], 0.1 to 50% for monomer [C] and 0.1 to 50% for monomer [D], Monomer [A] is a Compound of Formula (III)

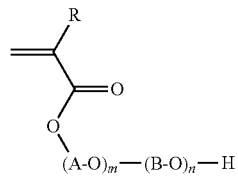

where A, B, R, n and m are each as defined above.

The alkylene oxide units $(A-O)_m$ and $(B-O)_n$ can be present either in a random arrangement or, as in the case of a preferred embodiment, in a blocklike arrangement.

In one preferred embodiment, $(A-O)_m$ represents propylene oxide units and $(B-O)_n$ represents ethylene oxide units, or $(A-O)_m$ represents ethylene oxide units and $(B-O)_n$ represents propylene oxide units, and the molar fraction of ethylene oxide units is preferably 50 to 98%, more preferably 60 to 95% and even more preferably 70 to 95%, based on the sum total (100%) of ethylene oxide and propylene oxide units.

The sum total of the alkylene oxide units can in principle be n+m=2 to 1000, although 2 to 500 is preferred, 2 to 100 is particularly preferred and 5 to 50 is even more particularly preferred.

Monomer [B] is a Compound of Formula (IV)

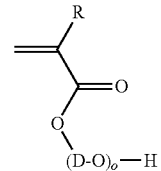

where D, R and o are each as defined above.

Monomer [C] is a Compound of Formula (Va) or (Vb):

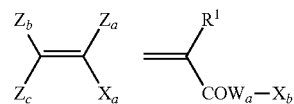

where $X_a$, $Z_a$, $Z_b$, $Z_c$, $X_b$, $W_a$ and $R^1$ are each as defined above.

Useful monomers (C) include for example the following esters and amides of acrylic acid and methacrylic acid: phenyl, benzyl, tolyl, 2-phenoxyethyl, phenethyl. Further monomers (C) are vinylaromatic monomers such as styrene and its derivatives, such as vinyltoluene and alpha-methylstyrene for example. The aromatic unit may also comprise heteroaromatics, as in 1-vinylimidazole for example.

Particularly preferred monomers (C) can be: styrene, 1-vinylimidazole, benzyl methacrylate, 2-phenoxyethyl methacrylate and phenethyl methacrylate.

Monomer (D) is a Compound of Formula (VI)

where $R^2$, $W_b$ and Y are each as defined above.

Monomers (D) include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethylcyclohexyl, 2-ethoxyethyl, tetrahydrofurfuryl and tetrahydropyranyl.

Preferred monomers (D) are the following alkyl esters and alkyl amides of acrylic acid and methacrylic acid: methyl, ethyl, propyl, butyl, isobutyl, 2-ethoxyethyl, myristyl, octadecyl, and particularly preferably 2-ethylhexyl and lauryl.

Component (iii) generally comprises cationic, anionic, amphoteric or nonionic compounds which enhance pigment wetting (wetting agents, wetters), for example, alkyl sulfates such as, for example, lauryl sulfate, alkylbenzene sulfonic acid, short-chain alkoxylation products such as, for example, lauryl alcohol reacted with approximately 5 mol of ethylene oxide or alkynediols.

Component (iv) in the pigment formulations of the present invention comprises customary dispersants and surfactants useful for preparing aqueous pigment dispersions, or mixtures thereof. Anionic, cationic, amphoteric or nonionic surface-active compounds are typically used.

Component (v) comprises for example thickeners, preservatives, viscosity stabilizers, grinding assistants and fillers. Further customary additives are antisettling agents, photoprotectants, antioxidants, degassers/defoamers, foam-reducing agents, anticaking agents and also viscosity and rheology improvers. Useful viscosity regulators include for example polyvinyl alcohol and cellulose derivatives. Water-soluble natural or manufactured resins and also polymers may similarly be included as filming or binding agents to enhance bonding strength and abrasion resistance. Useful pH regulators include organic or inorganic bases and acids. Preferred organic bases are amines, for example ethanolamine, diethanolamine, triethanolamine, N,N-dimethylethanolamine, diisopropylamine, aminomethylpropanol or dimethylaminomethylpropanol. Preferred inorganic bases are sodium hydroxide, potassium hydroxide, lithium hydroxide or ammonia. Component (v) may also comprise fats and oils of vegetable and animal origin, for example beef tallow, palm kernel fat, coconut fat, rapeseed oil, sunflower oil, linseed oil, palm oil, soy oil, groundnut oil and whale oil, cotton seed oil, maize oil, poppy seed oil, olive oil, castor oil, colza oil, safflower oil, soybean oil, thistle oil, sunflower oil, herring oil, sardine oil. Common additives also include saturated and unsaturated higher fatty acids, for example palmitic acid, cyprylic acid, capric acid, myristic acid, lauric acid, stearic acid, oleic acid, linoleic acid, linolenic acid, caproic acid, caprylic acid, arachidic acid, behenic acid, palmitoleic acid, gadoleic acid, erucic acid and ricinoleic acid, and also salts thereof.

The present invention also provides a process for preparing the pigment formulations of the present invention, which process comprises dispersing component (i) in the form of powder, granulate or aqueous presscake in the presence of water and also components (ii) and optionally (iii), (iv) and (v). Preferably, the components (ii) and optionally one or more of the components (iii), (iv) and (v) are initially mixed and homogenized, then the component (i) is stirred into the initially charged mixture, wherein the component (i) is incipiently pasted and predispersed. Depending on the texture of component (i), the predispersion is subsequently finely dispersed or finely dissipated, with or without cooling, using a grinding or dispersing assembly. Such may include stirrers, dissolvers (sawtooth stirrers), rotor-stator mills, ball mills, stirred media mills such as sand and bead mills, high speed mixers, kneaders, roll stands or high performance bead mills. The fine dispersing or to be more precise grinding is carried on to the desired particle size distribution and can take place at temperatures in the range from 0 to 100° C., advantageously at a temperature between 10 and 70° C. and preferably at 20 to 60° C. Following the fine-dispersing operation, deionized water is used to set a concentration of about 20% and a spray dryer is used to dry the dispersion to obtain a dry powder or, depending on the choice of drying parameters, a granulate.

The dry pigment formulations of the present invention are useful for pigmenting and dyeing natural and synthetic materials of any kind, more particularly aqueous paints, emulsion and varnish colors (emulsion varnishes) and solvent-containing varnishes.

The pigment formulations of the present invention are further useful for coloration of macromolecular materials of any kind, for example natural and synthetic fiber materials, preferably cellulose fibers, also paper pulp coloration and also laminate coloration. Further uses are the production of printing colors, for example textile printing colors, flexographic printing inks, decorative printing inks or intaglio printing inks, wallpaper colors, water-thinnable varnishes, wood preservation systems, viscose dope dyeing systems, varnishes, including powder coatings, sausage casings, seed, fertilizers, glass, particularly glass bottles, and also for mass coloration of roof shingles, in coloration for renders, concrete, wood stains, colored pencil leads, felt tip pens, waxes, paraffins, graphics inks, ballpoint pen pastes, chalks, washing and cleaning compositions, shoe care agents, latex products, abrasives, and also for coloration of plastics or high molecular weight materials of any kind. Examples of high molecular weight organic materials are cellulose ethers and esters, such as ethylcellulose, nitrocellulose, cellulose acetate or cellulose butyrate, natural resins or synthetic resins, such as addition polymerization resins or condensation resins, for example amino resins, particularly urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, latices, silicone, silicone resins, individually or in admixture.

The pigment formulations of the present invention are further useful for producing printing inks for use in all conventional ink-jet printers, particularly for those based on the bubble jet or piezo process. These printing inks can be used to print paper and also natural or synthetic fiber materials, foils and plastics. Additionally, the pigment formulations of the present invention can be used for printing various kinds of coated or uncoated substrate materials, for example for printing paper board, cardboard, wood and woodbase materials, metallic materials, semiconductor materials, ceramic materials, glasses, glass and ceramic fibers, inorganic materials of construction, concrete, leather, comestibles, cosmetics, skin and hair. The substrate material may be two-dimensionally planar or spatially extended, i.e., three-dimensionally configured, and may be printed or coated completely or only in parts.

The pigment formulations of the present invention are also useful as a colorant in electrophotographic toners and developers, for example in one- or two-component powder toners (also called one- or two-component developers), magnet toners, liquid toners, latex toners, polymerization toners and also specialty toners.

The pigment formulations of the present invention are also useful as a colorant in liquid inks, preferably ink-jet inks, for example aqueous or nonaqueous (solvent based), microemulsion inks, UV-curable inks, and also in such inks that operate according to the hot melt process.

The pigment formulations of the present invention can also be used as colorants for color filters for flat panel displays, not only for additive but also for subtractive color production, also for photoresists and also as colorants for "electronic inks" or "e-inks" or "electronic paper" or "e-paper".

Preparation of Copolymeric Dispersants (ii)
Synthesis Prescription 1 (Polymerization):

A flask equipped with stirrer, reflux condenser, internal thermometer and nitrogen inlet is initially charged with monomer [A], monomer [B], monomer [C], monomer [D] and the molecular weight regulator in solvent under nitrogen introduction in the parts by weight reported in the tables which follow. Then, the temperature is raised to 80° C. with stirring and a solution of the initiator is added during one hour by metering. The batch is subsequently further stirred at that temperature for 2 hours, and then the solvent is removed under reduced pressure.

Synthesis Prescription 2:

General synthesis prescription for converting the polymers obtained according to synthesis prescription 1 to anionic copolymers having ether sulfate groups on the side chains:

The copolymer is initially charged with amidosulfonic acid and urea to a flask under nitrogen. Then, the initial charge is heated to 100° C. for 4 hours with stirring. Subsequently, pH 6.5 to 7.5 is set with 50% by weight aqueous sodium hydroxide solution. NMR spectroscopy can be used to verify a degree of conversion of >95% to the corresponding sulfuric ester ammonium salt.

Synthesis Prescription 3:

General synthesis prescription for converting the polymers obtained according to synthesis prescription 1 to anionic copolymers having sulfosuccinate groups on the side chains:

The copolymer is initially charged to a flask under nitrogen. Then, maleic anhydride and sodium hydroxide are added and the mixture is heated with stirring to a temperature of 75 to 85° C. At this temperature, the mixture is stirred for three hours and then admixed with aqueous sodium sulfite solution (10% strength by weight) by metered addition. The mixture is stirred at 60 to 70° C. to complete the reaction and finally adjusted to pH 7 with 50% by weight aqueous sodium hydroxide solution.

The following two tables contain two-stage synthesis examples wherein the polymer is first prepared according to synthesis prescription 1 and then the anionic derivative of the polymer is prepared according to synthesis prescription 2 or 3.

| | Example No. | 1 | 2 | 3 | 4 | 5 | 6 | 7 | 8 | 9 | 10 |
|---|---|---|---|---|---|---|---|---|---|---|---|
| Monomer [A] | polyglycol 1 | | | | | | 143.8 | | | 243.2 | 15.9 |
| | polyglycol 2 | 137.3 | | | 106.9 | | | | | | |
| | polyglyool 3 | | | 93.0 | | | | 242.5 | | | |
| | polyglycol 4 | | 0.4 | | | 154.0 | | | 339.1 | | |
| Monomer [B] | polyglycol 6 | 183.1 | 277.8 | 186.0 | 285.0 | 231.0 | 102.7 | 121.3 | 56.5 | 69.5 | 227.3 |
| Monomer [C] | 1-vinylimidazole | | 13.1 | | | | | | 0.4 | | |
| | styrene | 19.0 | | | | 8.0 | | | | | |
| | benzyl methacrylate | | | 0.4 | | | 72.3 | | | | |
| | phenethyl methacrylate | | | | 0.4 | | | | | 66.0 | |
| | 2-phenoxyethyl methacrylate | | | | | | | | 0.4 | | 93.6 |
| Monomer [D] | 2-ethylhexyl methacrylate | | | | 110.5 | | | | | | |
| | lauryl methacrylate | 46.5 | | | | | | 52.2 | | | |
| | stearyl methacrylate | | 94.2 | | 0.4 | | | | 0.4 | | |
| | isobornyl methacrylate | | | | | | 0.4 | | 26.9 | | |
| | vinyl neodecanoate | | | | | | | | | 0.4 | 45.0 |
| Initiator | AMBN | 7.0 | | 8.0 | 4.1 | | | 4.7 | 2.2 | 10.7 | 9.2 |
| | dibenzoyl peroxide | | 8.4 | | | 5.6 | 16.2 | | | | |
| Regulator | dodecanethiol | 7.0 | 6.6 | | 4.1 | | 12.6 | 4.6 | 2.1 | 10.6 | 9.1 |
| | ethyl mercaptan | | | 2.4 | | 1.3 | | | | | |
| Solvent | methyl ethyl ketone | | | | | 600 | | | 600 | | |
| | methyl isobutyl ketone | | 600 | | | | | | | 600 | 600 |
| | isopropanol | 600 | | 600 | 600 | | 600 | 600 | | | |
| | $M_w$ of polymer obtained | 9800 | 14200 | 13500 | 17100 | 20500 | 16000 | 18900 | 17700 | 11300 | 19000 |
| | derivatization of polymer by synthesis prescription | 2 | 3 | 2 | 2 | 3 | 3 | 2 | 3 | 2 | 2 |
| | amidosulfonic acid | 17.4 | | 6.4 | 6.8 | | | 23.1 | | 33.1 | 4.3 |
| | urea | 0.3 | | 0.1 | 0.1 | | | 0.4 | | 0.6 | 0.1 |
| | maleic anhydride | | 15.0 | | | 8.3 | 22.1 | | 18.3 | | |
| | NaOH | | 0.9 | | | 0.5 | 1.32 | | 1.09 | | |
| | sodium sulfite solution (10% in water) | | 19.2 | | | 10.7 | 28.5 | | 23.5 | | |

| | Example No. | 11 | 12 | 13 | 14 | 15 | 16 | 17 | 18 | 19 | 20 |
|---|---|---|---|---|---|---|---|---|---|---|---|
| Monomer [A] | polyglycol 1 | | | | | | 155.4 | | | 212.7 | 57.3 |
| | polyglycol 2 | | 195.5 | | | 199.0 | | | | | |
| | polyglyool 3 | | | 66.9 | | | | | 324.7 | | |
| | polyglycol 4 | | 0.4 | | 246.6 | | | | 373.4 | | |

-continued

| | | | | | | | | | | |
|---|---|---|---|---|---|---|---|---|---|---|
| Monomer [B] | polyglycol 5 | 91.2 | 177.2 | 117.0 | 185.8 | 129.5 | 77.7 | 28.4 | 21.8 | 106.3 | 114.7 |
| Monomer [C] | 1-vinylimidazole | | 23.8 | | | | | | | | |
| | styrene | 27.1 | | | 0.4 | | 12.8 | | | | |
| | benzyl methacrylate | | | | | | | 78.2 | | | |
| | phenethyl methacrylate | | | | | | | | 0.4 | | 57.7 |
| | 2-phenoxyethyl methacrylate | | | | 0.4 | | | | 0.4 | | 135.0 |
| Monomer [D] | 2-ethylhexyl methacrylate | | | 198.6 | | | | | | | |
| | lauryl methacrylate | 66.2 | | | | | | 56.4 | | 0.4 | |
| | stearyl methacrylate | | 171.6 | | | 0.4 | | | | | |
| | isobornyl methacrylate | | | | 0.4 | | | 36.0 | | | |
| | vinyl neodecanoate | | | | | | | | 0.4 | | 64.9 |
| Initiator | AMBN | 10.0 | | 13.5 | 7.6 | | | 5.5 | 2.4 | 11.7 | 14.2 |
| | dibenzoyl peroxide | | 15.3 | | | 9.0 | 17.5 | | | | |
| Regulator | dodecanethiol | 9.9 | 12.0 | | 7.6 | | 14.8 | 5.4 | 2.4 | 11.5 | 14.0 |
| | ethyl mercaptan | | | 4.1 | | 2.2 | | | | | |
| Solvent | methyl ethyl ketone | | | | | 600 | | 600 | | | |
| | methyl isobutyl ketone | | 600 | | | | | | | 600 | 600 |
| | isopropanol | 600 | | 600 | 600 | | 600 | | 600 | | |
| | $M_w$ of polymer obtained | 7100 | 8200 | 14900 | 9500 | 17100 | 12600 | 22800 | 16000 | 9300 | 8400 |
| | derivatization of polymer by synthesis prescription | 2 | 2 | 3 | 2 | 3 | 2 | 3 | 2 | 2 | 3 |
| | amidosulfonic acid | 12.4 | 24.1 | | 25.3 | | 21.2 | | 17.8 | 28.9 | |
| | urea | 0.2 | 0.4 | | 0.4 | | 0.4 | | 0.3 | 0.5 | |
| | maleic anhydride | | | | 3.6 | 13.3 | | 17.5 | | | 8.8 |
| | NaOH | | | | 0.2 | 0.8 | | 1.0 | | | 0.5 |
| | sodium sulfite solution (10% in water) | | | | 4.6 | 17.1 | | 22.5 | | | 11.3 |

Composition of Monomer [A]:

Polyglycol 1 polyalkylene glycol monomethacrylic ester (formula (III), m=2, n=3-4; (A-O) corresponds to [CH$_2$CH(CH$_3$)O)], (B—O) corresponds to (CH$_2$CH$_2$O)), molar mass about 350 g/mol Polyglycol 2 polyalkylene glycol monomethacrylic ester (formula (III), m=2, n=12-13; (A-O) corresponds to (CH$_2$CH(CH$_3$)O)), (B—O) corresponds to (CH$_2$CH$_2$O)), molar mass about 750 g/mol Polyglycol 3 polyalkylene glycol monomethacrylic ester (formula (III), m=2, n=17-19; (A-O) corresponds to (CH$_2$CH(CH$_3$)O)), (B—O) corresponds to (CH$_2$CH$_2$O)), molar mass about 1000 g/mol Polyglycol 4 polyalkylene glycol monomethacrylic ester (formula (III), m=2, n=40-42; (A-O) corresponds to (CH$_2$CH(CH$_3$)O)), (B—O) corresponds to (CH$_2$CH$_2$O)), molar mass about 2000 g/mol Composition of Monomer [B]:

Polyglycol 5 polypropylene glycol monomethacrylic ester (formula (IV), o=4-5; (D-0) corresponds to [CH$_2$CH(CH$_3$)O)], molar mass about 350 g/mol Polyglycol 6 polypropylene glycol monomethacrylic ester (formula (IV), o=15-16; (D-0) corresponds to [CH$_2$CH(CH$_3$)O)], molar mass about 1000 g/mol AMBN=2,2'-azobis(2-methylbutyronitrile)

Production of a Pigment Formulation

The pigment, in the form alternatively of powder, granulate or presscake, was pasted up in deionized water together with the dispersant and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, grinding media were separated off, the pigment formulation was isolated and standardized with deionized water to a concentration of about 20% and dried by means of a spray dryer from Büchi (Büchi 190). A dry powder was obtained.

Evaluation of a Pigment Formulation

Color strength and hue were determined in accordance with DIN 55986. The aqueous pigment dispersion and the dry powder were tested (color strength and compatibilities with the medium to be colored) in a conventional waterborne emulsion paint for interiors and in a conventional solvent borne lacquer. The rub-out test was carried out by applying the paint, after mixing with the pigment dispersion, to a paint card. Subsequently, the applied coating was rubbed with the finger on the lower part of the paint card. Incompatibility was present when the rubbed area is then more strongly colored than the adjacent area not aftertreated (the rub-out test is described in DE 2 638 946).

Viscosity was determined using a cone-and-plate viscometer (Roto Visco 1) from Haake at 20° C. (titanium cone: Ø 60 mm, 1°), the relationship between viscosity and shear rate in a range between 0 and 200 s$^{-1}$ being investigated. Viscosities were measured at a shear rate of 60 s$^{-1}$.

To evaluate the storage stability of the dispersions, viscosity was measured directly after production of the formulation and also after four weeks' storage at 50° C.

The pigment formulations described in the examples which follow were produced by the method described above, the following constituents being used in the stated amounts such that 100 parts of the pigment formulation are formed. Parts are by weight in the example below:

EXAMPLE 1

35 parts of C.I. Pigment Yellow 74
14 parts of polymer from synthesis example 1 (table)
1 part of wetter
50 parts of water After drying, the pigment formulation has the following composition, neglecting a residual water content of about 1%:

70 parts of C.I. Pigment Yellow 74
28 parts of polymer from synthesis example 1 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. After preparation, the viscosity is 1.26 Pa·s. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 2

35 parts of C.I. Pigment Red 168
5 parts of polymer from synthesis example 18 (table)
10 parts of component (iv), ether sulfate
50 parts of water After drying, the pigment formulation had the following composition, neglecting a residual water content of about 1%:
70 parts of C.I. Pigment Red 168
10 parts of polymer from synthesis example 18 (table)
20 parts of component (iv), ether sulfate The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 3

35 parts of C.I. Pigment Red 122
5 parts of polymer from synthesis example 11 (table)
10 parts of component (iv), ether sulfate
50 parts of water After drying, the pigment formulation had the following composition, neglecting a residual water content of about 1%:
70 parts of C.I. Pigment Red 122
10 parts of polymer from synthesis example 11 (table)
20 parts of component (iv), ether sulfate The aqueous pigment formulation has a high color strength in the white dispersion and in the lacquer and is stable. The rub-out test shows no color strength differences compared with the rubbed area. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 4

35 parts of C.I. Pigment Black 7
14 parts of polymer from synthesis example 3 (table)
1 part of wetter
50 parts of water After drying, the pigment formulation has the following composition, neglecting a residual water content of about 1%:
70 parts of C.I. Pigment Black 7
28 parts of polymer from synthesis example 3 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 5

35 parts of C.I. Pigment Blue 15:3
5 parts of polymer from synthesis example 9 (table)
10 parts of component (iv), alcohol ethoxylate
50 parts of water After drying, the pigment formulation has the following composition, neglecting a residual water content of about 1%:
70 parts of C.I. Pigment Blue 15:3
10 parts of polymer from synthesis example 9 (table)
20 parts of component (iv), alcohol ethoxylate The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 6

35 parts of C.I. Pigment Green 7
14 parts of polymer from synthesis example 15 (table)
1 part of wetter
50 parts of water After drying, the pigment formulation has the following composition, neglecting a residual water content of about 1%:
70 parts of C.I. Pigment Green 7
28 parts of polymer from synthesis example 15 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is readily dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 7

35 parts of C.I. Pigment Blue 15
5 parts of polymer from synthesis example 17 (table)
10 parts of component (iv), ether sulfate
50 parts of water After drying, the pigment formulation has the following composition, neglecting a residual water content of about 1%:
70 parts of C.I. Pigment Blue 15
10 parts of polymer from synthesis example 17 (table)
20 parts of component (iv), ether sulfate The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and very readily dispersible in the solvent borne lacquer. Manual stirring is done for 3 minutes.

Both color systems give a high color strength and also a nonflocculating application free of specks. The rub-out test does not show any color strength differences compared to the after-rubbed area.

EXAMPLE 8

35 parts of C.I. Pigment Red 101
14 parts of polymer from synthesis example 10 (table)
1 part of wetter
50 parts of water After drying, the pigment formulation has the following composition, neglecting a residual water content of about 1%:
70 parts of C.I. Pigment Red 101
28 parts of polymer from synthesis example 10 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is readily and spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 9

35 parts of C.I. Pigment Yellow 42
5 parts of polymer from synthesis example 8 (table)
10 parts of component (iv), phosphoric ether
50 parts of water After drying, the pigment formulation has the following composition, neglecting a residual water content of about 1%:
70 parts of C.I. Pigment Yellow 42
10 parts of polymer from synthesis example 8 (table)
20 parts of component (iv), phosphoric ether The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 10

35 parts of C.I. Pigment Violet 23
14 parts of polymer from synthesis example 3 (table)
1 part of wetter
50 parts of water After drying, the pigment formulation had the following composition, neglecting a residual water content of about 1%:
70 parts of C.I. Pigment Violet 23
28 parts of polymer from synthesis example 3 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 11

35 parts of C.I. Pigment Yellow 97
5 parts of polymer from synthesis example 20 (table)
10 parts of component (iv), ether sulfate
50 parts of water After drying, the pigment formulation has the following composition, neglecting a residual water content of about 1%:
70 parts of C.I. Pigment Yellow 97
10 parts of polymer from synthesis example 20 (table)
20 parts of component (iv), ether sulfate The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and in the solvent borne lacquer. Manual stirring is down for 3 minutes. Both color systems give a high color strength and also a nonflocculating application free of specks. The rub-out test does not show any color strength differences compared to the after-rubbed area.

EXAMPLE 12

35 parts of C.I. Pigment Red 112
14 parts of polymer from synthesis example 14 (table)
1 part of wetter
50 parts of water After drying, the pigment formulation has the following composition, neglecting a residual water content of about 1%:
70 parts of C.I. Pigment Red 112
28 parts of polymer from synthesis example 14 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 13

35 parts of. C.I. Pigment Green 50
5 parts of polymer from synthesis example 6 (table)

10 parts of component (iv), alcohol ethoxylate
50 parts of water

After drying, the pigment formulation has the following composition, neglecting a residual water content of about 1%:
70 parts of C.I. Pigment Green 50
10 parts of polymer from synthesis example 6 (table)
20 parts of component (iv), alcohol ethoxylate The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and in the solvent borne lacquer. Manual stirring is down for 3 minutes. Both color systems give a high color strength and also a nonflocculating application free of specks. The rub-out test does not show any color strength differences compared to the after-rubbed area.

EXAMPLE 14

35 parts of C.I. Pigment Black 33
14 parts of polymer from synthesis example 4 (table)
1 part of wetter
50 parts of water After drying, the pigment formulation has the following composition, neglecting a residual water content of about 1%:
70 parts of C.I. Pigment Black 33
28 parts of polymer from synthesis example 4 (table)
2 parts of wetter The aqueous pigment formulation has a high color strength in the white dispersion and in the lacquer and is stable. The rub-out test shows no color strength differences compared with the rubbed area. The dispersion proves to be readily flowable and storage stable since it is still readily flowable after 28 days' storage at 50° C. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

EXAMPLE 15

35 parts of C.I. Pigment White 6
5 parts of polymer from synthesis example 17 (table)
10 parts of component (iv), ethoxylated amine
50 parts of water After drying, the pigment formulation has the following composition, neglecting a residual water content of about 1%:
70 parts of C.I. Pigment White 6
10 parts of polymer from synthesis example 17 (table)
20 parts of component (iv), ethoxylated amine The aqueous pigment formulation has a high color strength in the white dispersion and in the lacquer and is stable. The rub-out test shows only very slight color strength differences compared with the rubbed area. The dry powder is spontaneously dispersible in the waterborne white emulsion and in the solvent borne lacquer. Manual stirring is done for 3 minutes. Both color systems give a high color strength and also a nonflocculating application free of specks. The rub-out test does not show any color strength differences compared to the after-rubbed area.

What is claimed is:

1. A pigment formulation comprising
   (i) at least one organic pigment, at least one inorganic pigment or a combination thereof,
   (ii) a dispersant of formula (I) or (II), or mixtures of dispersants of formulae (I) and (II), $$\left[\begin{array}{c}R^2\\|\\-C-\\|\\H_2\end{array}\right]_d \left[\begin{array}{c}ZB\ ZA\\|\ |\\-\phantom{C}-\\|\\ZC\ XA\end{array}\right]_c \left[\begin{array}{c}R\\|\\-C-\\|\\H_2\end{array}\right]_b \left[\begin{array}{c}R\\|\\-C-\\|\\H_2\end{array}\right]_a * \quad (I)$$

with substituents: =O, =O, =O; WB–Y, O–(D-O)$_o$–QM, O–(A-O)$_m$–(B-O)$_n$–QM $$\left[\begin{array}{c}R^2\\|\\-C-\\|\\H_2\end{array}\right]_d \left[\begin{array}{c}R^1\\|\\-C-\\|\\H_2\end{array}\right]_c \left[\begin{array}{c}R\\|\\-C-\\|\\H_2\end{array}\right]_b \left[\begin{array}{c}R\\|\\-C-\\|\\H_2\end{array}\right]_a * \quad (II)$$

with substituents: —O, =O, =O, =O; WB–Y, WA–XB, O–(D-O)$_o$–QM, O–(A-O)$_m$–(B-O)$_n$–QM wherein a=0.001–0.9 b=0.001–0.9 c=0.001–0.9 d=0.001–0.9 subject to the proviso that the sum of a+b+c+d equals 1;

A is a $C_2$-to $C_4$alkylene,

B is a $C_2$-to $C_4$-alkylene other than A,

R is hydrogen or methyl, m is from 1 to 500;

n is from 1 to 500, subject to the proviso that the sum of m+n equals 2 to 1000;

D is a $C_3$-alkylene, o is from 2 to 500;

XA is an aromatic or araliphatic radical having 3 to 30 carbon atoms optionally containing heteroatoms selected from the group consisting of N, O and S, ZA is H or ($C_1$-$C_4$)-alkyl, ZB is H or ($C_1$-$C_4$)-alkyl, ZC is H or ($C_1$-$C_4$)-alkyl;

$R^1$ is hydrogen or methyl,

XB is an aromatic or araliphatic radical having 3 to 30 carbon atoms optionally containing heteroatoms selected from the group consisting of N, O and S, WA is oxygen or an NH group;

$R^2$ is hydrogen or methyl,

Y is an aliphatic hydrocarbyl radical having 1 to 30 carbon atoms, optionally linear, branched or cyclic, and optionally containing heteroatoms selected from the group consisting of O, N and S, and optionally is unsaturated, WB is oxygen or an NH group;

Q is $SO_3$, $CH_2COO$, $PO_3M$, or QM is

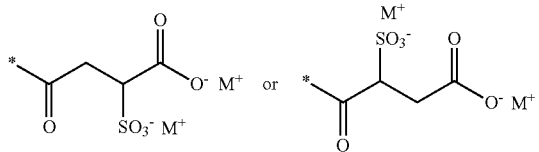

M is H, a metal cation or ammonium, an alkylated ammonium ion, or a combination thereof and wherein the asterisk in the formula QM represents a free valency and indicates the linkage to the group (B—O)n.

2. The pigment formulation as claimed in claim 1, containing from 30% to 90% by weight of dry component (i).

3. The pigment formulation as claimed in claim 1, containing from 0.1% to 30% by weight of dry component (ii).

4. The pigment formulation as claimed claim 1, containing by way of component
   (i) 60% to 85% by weight,
   (ii) 10% to 30% by weight,
   all based on the total weight of the pigment formulation when dry.

5. The pigment formulation as claimed in claim 1, wherein the organic pigment is a monoazo, disazo, laked azo, β-naphthol, Naphthol AS, benzimidazolone, disazo condensation, azo metal complex pigment, phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline or diketopyrrolopyrrole pigment or a carbon black.

6. The pigment formulation as claimed in claim 1, wherein the alkylene oxide units $(A\text{-}O)_m$ and $(B\text{—}O)_n$ are present in blocks.

7. A process for preparing a pigment formulation as claimed in claim 1, comprising the step of dispersing component (i) in the form of powder, granulate or aqueous presscake in the presence of water and component (ii).

8. A dyed or pigmented natural or synthetic material dyed or pigmented with the pigment formulation as claimed in claim 1.

9. A pigmented aqueous paint, emulsion, varnish color or solvent-containing varnish pigmented with pigment formulation as claimed in claim 1.

* * * * *